United States Patent [19]

Derby et al.

[11] Patent Number: 5,359,593
[45] Date of Patent: Oct. 25, 1994

[54] DYNAMIC BANDWIDTH ESTIMATION AND ADAPTATION FOR PACKET COMMUNICATIONS NETWORKS

[75] Inventors: Jeffrey H. Derby, Chapel Hill; John E. Drake, Jr., Pittsboro, both of N.C.; Claude Galand, Cagnes Sur Mer, France; Levent Gun, Durham, N.C.; Gerald A. Marin, Chapel Hill, N.C.; Allen L. Roginsky, Durham, N.C.; Theodore E. Tedijanto, Cary, N.C.

[73] Assignee: International Business Machines Corporation, Armonk, N.Y.

[21] Appl. No.: 112,736

[22] Filed: Aug. 26, 1993

[51] Int. Cl.$^5$ .................. H04J 3/14; H04L 12/56
[52] U.S. Cl. .................. 370/17; 370/79; 370/94.1
[58] Field of Search .................. 370/13, 17, 60, 60.1, 370/94.1, 94.2, 94.3, 84, 79

[56] References Cited

U.S. PATENT DOCUMENTS

| | | | |
|---|---|---|---|
| 5,265,091 | 11/1993 | van Landegem | 370/94.1 |
| 5,267,232 | 11/1993 | Katsube et al. | 370/94.1 |
| 5,274,625 | 12/1993 | Derby et al. | 370/94.1 |
| 5,282,203 | 1/1994 | Oochi | 370/94.1 |

*Primary Examiner*—Douglas W. Olms
*Assistant Examiner*—Hassan Dizov
*Attorney, Agent, or Firm*—Gerald R. Woods

[57] ABSTRACT

Access control for a packet communications network includes a dynamic bandwidth updating mechanism which continuously monitors the mean bit rate of the signal source and the loss probability of the connection. These values are filtered to remove noise and then used to test whether the values fall within a pre-defined acceptable adaptation region in the mean bit rate, loss probability plane. Values falling outside of this region trigger bandwidth updating procedures which, in turn, result in acquiring a new connection bandwidth, and determining new filter parameters and new parameters for a leaky bucket access mechanism.

10 Claims, 5 Drawing Sheets

FIG. 1
PACKET COMMUNICATIONS NETWORK

FIG. 2
CONNECTION REQUEST MESSAGE (PRIOR ART)

FIG. 3

SOURCE BANDWIDTH MANAGEMENT SUBSYSTEM

FIG. 4

ESTIMATION AND ADAPTATION MODULE

FIG. 5

**ADAPTATION REGION
IN MEAN BIT RATE VS. EFFECTIVE BURST LENGTH PLANE**

FIG. 6

**ADAPTATION REGION
IN MEAN BIT RATE VS. RED MARKING PROBABILITY PLANE**

FIG. 8
UPDATING CONNECTION

5,359,593

DYNAMIC BANDWIDTH ESTIMATION AND ADAPTATION FOR PACKET COMMUNICATIONS NETWORKS

TECHNICAL FIELD

This invention relates to traffic management in packet communications networks and, more particularly, to traffic monitoring, traffic measurement filtering, and adaptive bandwidth adjustment for such networks.

BACKGROUND OF THE INVENTION

In order to avoid congestion and insure adequate traffic flow in packet communication networks, it is common to control the access of packet sources to the network on an ongoing basis. In order to successfully control traffic access, it is necessary, first, to accurately characterize the traffic so as to provide appropriate bandwidth for carrying that traffic. Simple measurements which provide accurate estimates of the bandwidth requirements of a source are taught in the copending application Ser. No. 07/942,873, filed Sep. 10, 1992, U.S. Pat. No. 5,274,625, and assigned to applicants' assignee. In this application, the parameters used to characterize traffic include R, the peak bit rate of the incoming traffic in bits per second, m, the mean bit rate of the incoming traffic in bits per second, and b, the mean burst length of the traffic in bits. Rather than using the actual burst length, however, a so-called "exponential substitution" technique is used to calculate and equivalent burst length which would produce the same packet loss probability if the traffic were a well behaved exponentially distributed on/off process. For traffic widely differing from such an exponential process, this equivalent burst length produces a much more accurate characterization of the actual traffic and therefore permits a higher density of traffic on the same transmission facilities.

The measured parameters are used to control the access of signal sources to the network when the actual traffic behavior departs significantly from the initial assumptions. A leaky bucket mechanism is one technique for controlling access to the network when the traffic exceeds the initial assumptions, but yet permits transparent access to the network when the traffic remains within these initial assumptions. One such leaky bucket mechanism is shown in the copending application Ser. No. 07/943,097, filed Sep. 10, 1992, U.S. Pat. No. 5,311,513, and assigned to applicant's assignee. More particularly, the leaky bucket mechanism of this application prevents saturation of the network by low priority packets by limiting the number of low priority packets which can be transmitted in a fixed period of time while imposing a minimum on the number of red packets transmitted at a given time. Such leaky bucket control mechanisms optimize the low priority throughput of the packet network. High priority traffic, of course, is transmitted with little or no delay in the leaky bucket mechanism.

The above-described mechanisms are suitable for controlling traffic only if the traffic is reasonably well-behaved and remains within the general vicinity of the initially assumed traffic parameters. The traffic management system, however, must be structured to deal with traffic which is not well behaved and which departs substantially from the initially assumed traffic parameters. If such a departure persists for any significant length of time, a new connection bandwidth must be assigned to the connection to accommodate the new traffic parameters. Such adaptation of the control system to radical changes in traffic behavior presents the problems of filtering the traffic measurements to separate transient changes of traffic behavior from longer term changes, and determining reasonable ranges within which the initially assumed traffic parameters can be maintained and outside of which new connection bandwidths must be requested. A bandwidth too large for the actual traffic is wasteful of connection resources while a bandwidth too small results in excessive packet loss. Ancillary problems include reasonable ease in implementation of the adaptation process and reasonable computational requirements in realizing the implementation.

SUMMARY OF THE INVENTION

In accordance with the illustrative embodiment of the present invention, dynamic adaptation of a traffic control system to changes in the traffic parameters is provided by defining a region within which adaptation is not required and outside of which a new bandwidth allocation must be requested. In particular, the bandwidth requirement is adjusted upward if the measurements indicate that either a desired maximum packet loss probability will be exceeded or if the traffic on that connection will start to unfairly interfere with other connections sharing the transmission facilities. The bandwidth requirement can be adjusted downward, on the other hand, if significant bandwidth savings can be realized for both the user of the connection and for the balance of the network, without violating any quality of service guarantees for all of the connections. In further accord with the present invention, these limits on the adaptation region are converted to values of effective mean burst length and mean bit rates. The measured effective mean burst length and mean bit rates are then filtered to insure that the filtered values are statistically reliable, i.e., that a sufficient number of raw measurements are involved to insure a preselected confidence level in the results. This minimum number of raw measurements, in turn, determines the amount of time required to collect the raw measurements, given the mean bit rate of the traffic. This measurement time can be used to measure not only the statistics of the incoming dam stream to the leaky bucket, but also the effect of the leaky bucket on the incoming traffic. This latter measurement allows a measure of how well the leaky bucket is dealing with variances in the offered traffic and hence the packet loss probability.

When the traffic parameters fall outside of the desired adaptation region, a new connection with a different bandwidth is requested in order to accommodate the changes in the traffic parameters. Computations to determine the need for adaptation can be minimized by using extrapolation techniques between computed values marking the bounds of the adaptation region, and confining consideration to only the upper right quadrant of the adaptation region.

The adaptation mechanism of the present invention has the distinct advantage of insuring a continuously reasonable traffic management strategy by insuring dynamic adaptation when the needs of the connection or the needs of the network call for such adaptation. Moreover, unnecessary adaptation is avoided, reducing the overhead involved in such adaptation.

BRIEF DESCRIPTION OF THE DRAWINGS

A complete understanding of the present invention may be gained by considering the following detailed description in conjunction with the accompanying drawings, in which.

To facilitate reader understanding, identical reference numerals are used to designate elements common to the figures.

DETAILED DESCRIPTION

Figure 1:
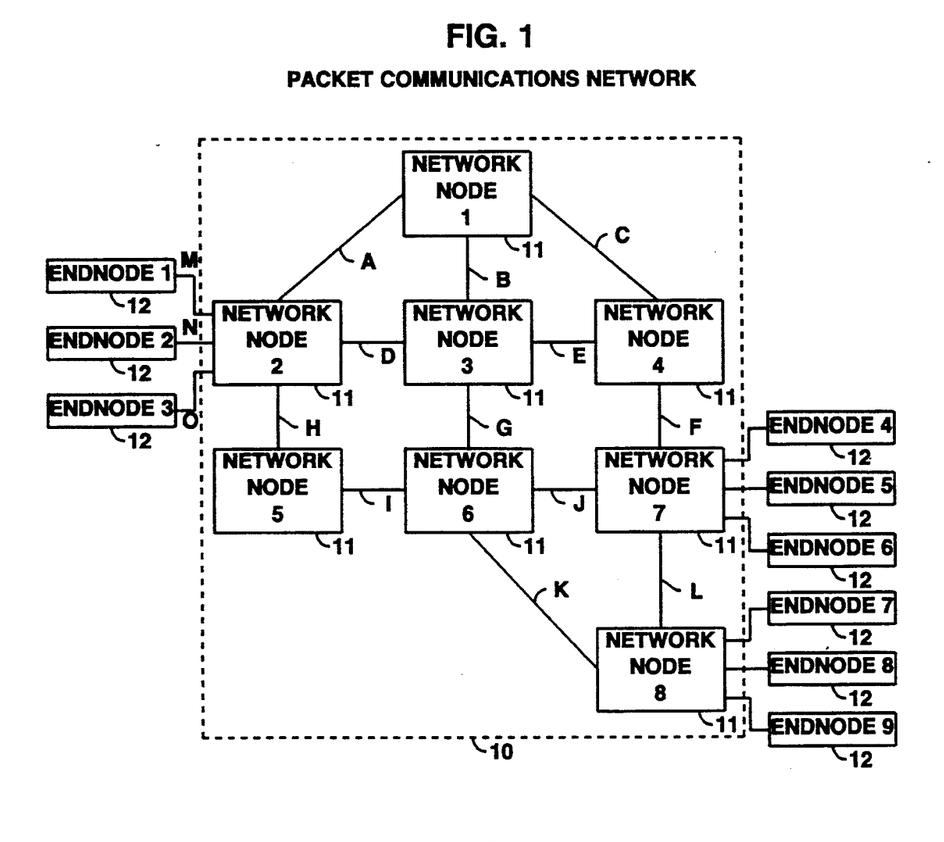
FIG. 1 shows a general block diagram of a packet communications network in which the dynamic traffic management mechanism of the present invention might find use.

Referring more particularly to FIG. 1, there is shown a general block diagram of a packet transmission system 10 comprising eight network nodes 11 numbered 1 through 8. Each of network nodes 11 is linked to others of the network nodes 11 by one or more communication links A through L. Each such communication link may be either a permanent connection or a selectively enabled (dial-up) connection. Any or all of network nodes 11 may be attached to end nodes, network node 2 being shown as attached to end nodes 1, 2 and 3, network node 7 being shown as attached to end nodes 4, 5 and 6, and network node 8 being shown as attached to end nodes 7, 8 and 9. Network nodes 11 each comprise a data processing system which provides data communications services to all connected nodes, network nodes and end nodes, as well as providing decision points within the node. The network nodes 11 each comprise one or more decision points within the node, at which point incoming data packets are selectively routed on one or more of the outgoing communication links terminated within that node or at another node. Such routing decisions are made in response to information in the header of the data packet. The network node also provides ancillary services such as the calculation of new routes or paths between terminal nodes, the provision of access control to packets entering the network at that node, and the provision of directory services and topology database maintenance at that node.

Each of end nodes 12 comprises either a source of digital data to be transmitted to another end node, a utilization device for consuming digital data received from another end node, or both. Users of the packet communications network 10 of FIG. 1 utilize an end node device 12 connected to the local network node 11 for access to the packet network 10. The local network node 11 translates the user's data into packets formatted appropriately for transmission on the packet network of FIG. 1 and generates the header which is used to route the packets through the network 10.

In order to transmit packets on the network of FIG. 1, it is necessary to calculate a feasible path or route through the network from the source node to the destination node for the transmission of such packets. To avoid overload on any of the links on this route, the route is calculated in accordance with an algorithm that insures that adequate bandwidth is available for the new connection. One such algorithm is disclosed in the copending application, Ser. No. 07/874,917, filed Apr. 28, 1992, U.S. Pat. No. 5,233,604, and assigned to applicant's assignee. Once such a route is calculated, a connection request message is launched on the network, following the computed route and updating the bandwidth occupancy of each link along the route to reflect the new connection. One such connection request message is shown in FIG. 2.

Figure 2:
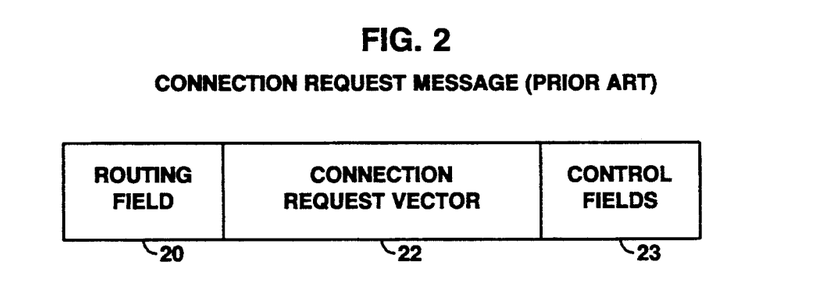
FIG. 2 shows a graphical representation of a connection request message which might be used to set up initial connections and dynamically altered connections in the packet communications network of FIG. 1, using the dynamic traffic management mechanism of the present invention.

In FIG. 2 there is shown a graphical representation of a connection request message to be launched from a source node in the network of FIG. 1 to a destination node in the network along a precalculated route. The connection message of FIG. 2 comprises a routing field 20 which includes the information necessary to transmit the connection message along the precalculated route. Also included in the connection request message of FIG. 2 is a connection request vector 22 which characterizes the important statistical characteristics of the new packet source and which allows this new source to be statistically multiplexed with the previously existing signals on each link of the route. As will be discussed in detail hereinafter, the connection request vector includes a relatively few parameters necessary to adequately characterize the packet source. As described in the afore-mentioned copending application, Ser. No. 943,097 and assigned to applicant's assignee, these parameters might include the maximum bit rate for the source, the mean of that bit rate, and the equivalent burst length of packets from that source.

The values in the connection request vector are used to test each link of the route to determine if the new connection can actually be supported by that link, and to update, separately for each link, the link occupancy metric for that link to reflect the addition of the new connection. If the link occupancy has changed since the route was calculated, the connection may be rejected at any node along the route, and the source node notified of the rejection. Finally, in FIG. 2, the control fields 23 include additional information used in establishing the connection, but which is not pertinent to the present invention and will not be further discussed here. Note that, when a connection is to be taken down, a connection removal message having the same format as FIG. 2 is transmitted along the route of the connection to be removed. The link occupancy of each link is then updated to reflect the removal of this connection by subtracting the metrics for the removed connection.

Figure 3:
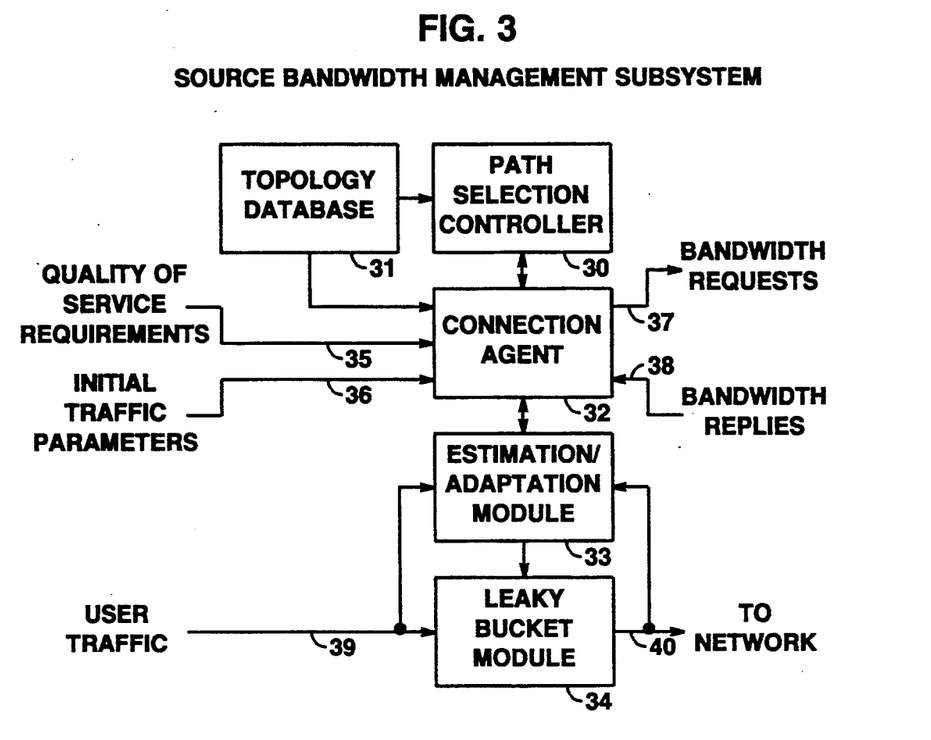
FIG. 3 shows a general block diagram of the network access subsystem for the network of FIG. 1 in which the dynamic traffic management mechanism of the present invention is implemented.

In FIG. 3 there is shown a general block diagram of the source bandwidth management subsystem in accordance with the present invention comprising a leaky bucket module 34 to which the user traffic on input line 39 is applied. The output of leaky bucket module 34 is applied to the network 10 of FIG. 1. A subsystem similar to that shown in FIG. 3 is provided for each source of user traffic to be applied to the network 10. These bandwidth management subsystems are located in the endnodes 12 of FIG. 1 and one such a bandwidth management subsystem is provided for each direction of transmission between two communicating users. Although such bandwidth management subsystems can be realized with hard-wired circuit components, the preferred embodiment utilizes a programmed computer since such an implementation is more readily modified to accommodate improvements and to reflect changes in traffic patterns.

In leaky bucket access control module 341 packets are launched into the network on line 40 with one of at least two different priority classes, conventionally called "red" and "green," where green is the higher priority. Green packets are guaranteed a pre-specified grade of service based on an acceptable level of delay and loss probability within the network. The red packets do not have the same guarantees and are discarded before the green packets when congestion occurs. Bandwidth-conserving strategies for optimally marking packets in a leaky bucket mechanism is disclosed in the copending application Ser. No. 943,097, filed Sep. 10, 1992, and assigned to applicants' assignee. In general, the function of the leaky bucket module 34 is to "shape" the traffic before it enters network 10 (FIG. 1), especially for user packets not conforming to the initially provided statistical description, by marking such packets red. If the traffic characteristics stay within the initially negotiated values, however, the red marking mechanism is sufficiently limited to insure the promised loss probability. If the incoming traffic characteristics depart substantially from the negotiated values, estimation and adaptation module 33 is invoked to take corrective action since the leaky bucket module 34 can no longer cope with the new traffic.

As described in connection with FIG. 1, when a new connection is to be set up through network 10, an initial estimate of the traffic characteristics is made by the packet source. This estimate arrives at the bandwidth management system of FIG. 3 on line 36 together with the quality of service requirements on line 35. Such quality of service (QOS) requirements include acceptable loss probabilities, acceptable delays, real-time delivery requirements, and so forth. Connection agent 32 passes these connection requirements on to path selection controller 30 which uses these requirements, together with the up-to-date network description in topology database 31 to calculate a connection path through network 10 (FIG. 1) which satisfies all of these requirements. One optimum connection path selection controller is described in the copending application Ser. No. 07/874,917, filed Apr. 28, 1992 and assigned to applicants' assignee. Once calculated, the proposed connection path is encoded in a connection request message such as that shown in FIG. 2 and launched as a bandwidth request onto the network 10 over line 37 of FIG. 3.

The bandwidth request message of FIG. 2 traverses the calculated connection path and, at each node along the route, is used to reserve, in the next leg of the connection, the bandwidth required to satisfy the requirements of the connection request. If sufficient bandwidth is available in each link of the connection along the computed path, the destination endnode 12 (FIG. 1) receives the request and transmits back an acceptance of the new connection. If, at any link along the route, insufficient bandwidth is available due to changes in the traffic patterns, a denial of the connection request is transmitted back to the source endnode. These bandwidth replies, whether negative or positive, are delivered back to connection agent 32 on line 38. If the connection is denied, the user source is notified and another attempt at the connection can be made later. If the connection is accepted, leaky bucket module 34 is activated and supplied with the appropriate parameters to control the access of the user traffic. The user then begins introducing traffic on line 39. At the same time, estimation and adaptation module 33 begins monitoring this incoming traffic to determine if any significant changes in the incoming traffic characteristics have occurred during the life of the connection. If so, module 33 notifies connection agent 32 to request a new bandwidth allocation, supplying connection agent 32 with the new traffic parameters required for the connection. As before, connection agent 32 launches a new bandwidth request on line 37 requesting the adjustment of the bandwidth of the connection. If the adjustment is accepted, the leaky bucket parameters are updated with the new traffic characteristics and estimation and adaptation module 33 continues to monitor the incoming traffic, but with the new characteristics. Note that only a new bandwidth allocation is requested, rather than a new connection. This saves the overhead involved in taking down the old connection and setting up a new connection. If the requested additional bandwidth is not available, the connection can be either taken down or given a lower priority, depending on the original negotiations with the sending party at the source node. The present invention is an improvement in the estimation and adaptation module 33 of FIG. 3.

Figure 4:
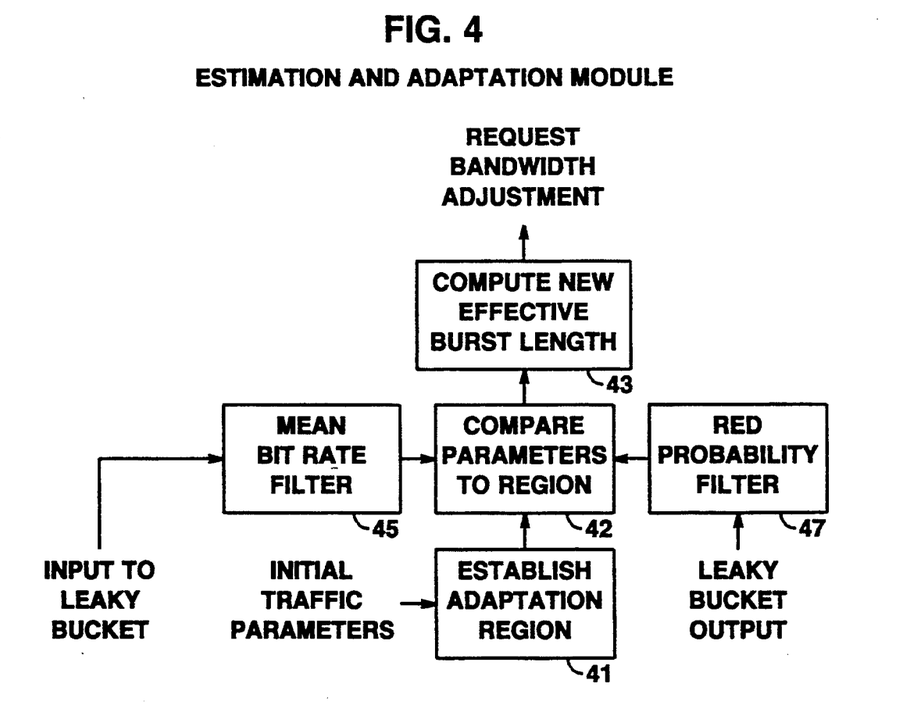
FIG. 4 shows a block diagram of the traffic characteristics estimation and adaptation module forming a part of the network access subsystem of FIG. 3.

In FIG. 4 there is shown a block diagram of an estimation and adaptation module in accordance with the present invention comprising a box 41 which uses the initial traffic parameters, supplied on line 36 of FIG. 3, to calculate an adaptation region. For convenience, this adaptation region is measured in units corresponding to the initially assumed mean bit rate of the incoming user traffic and the initially calculated red marking probability of the leaky bucket module 34 of FIG. 3. The actual input traffic is applied to mean bit rate filter 45 to determine the actual current mean bit rate of the incoming traffic. At the same time, the actual red marking probability of the leaky bucket module 34 (responsive to the actual traffic served by the leaky bucket module 34) is applied to red probability filter 47. The function of filters 45 and 47 is to filter out the transient changes in mean bit rate and red marking probability. The filtered mean bit rate and the filtered red marking probability are compared, in unit 42, to the adaptation region established in block 41. As long as these filtered parameters remain within the adaptation region, nothing is done. If either of the filtered parameters fall outside the adaptation region, however, a new effective burst length is computed in block 43 and the new effective burst length is used to request a new connection for this user's traffic. Before proceeding to a more detailed description of the adaptation process, the following variables will be defined:

R The maximum bit rate, in bits per second, of the input traffic as requested by the user source to initiate the connection.

m The mean bit rate, in bits per second, of the input traffic as requested by the user source to initiate the connection.

b The mean burst length, in bits, of the input traffic as requested by the user source to initiate the connection.

t The sampling period of both of filters 45 and 47. The filters 45 and 47 receive measurements and report filtered outputs to the compare unit 42 every t seconds, for a succession 1, 2, ... n, ... periods, at which time compare unit 42 makes a decision.

$m_n$ The raw measurement of the mean bit rate of the input traffic for the nth sampling period of duration t.

$\xi_n$ The raw measurement of the red marking probability being used in the leaky bucket 34 during the nth sampling period of duration t.

$\hat{m}_n$ The filtered value of the mean bit rate, as filtered by bit rate filter 45 of FIG. 4, for the input traffic at the end of the nth sampling period.

$\hat{\xi}_n$ The filtered value of the red marking probability, as filtered by red marking probability filter 47 of FIG. 4, for the leaky bucket at the end of the nth sampling period.

$b_{ef}{}^n$ The effective burst length of the incoming traffic at the end of the nth sampling period, used to request a new connection.

$\gamma^n$ The green token generation rate used in the leaky bucket module 34 of FIG. 3 during the nth sampling period. The green token rate determines the rate at which packets marked green can be injected into the network.

$M_g{}^n$ The size of of the green token pool in the leaky bucket module 34 of FIG. 3 during the nth sampling period. The size of the green token pool determines the length of green packets injected into the network.

Measuring the mean bit rate $m_n$ of the incoming traffic is simple. A counter counts the number of bits received during the sampling period t and divides this number by the length t. Similarly, the red marking probability $\xi_n$ is equal to the number of packets marked red during the sampling period t divided by the total number of packets transmitted during the period t. It is these raw figures which are delivered to filters 45 and 47, respectively, every t seconds. It will be noted that adaptation region (established when the connection is initially set up and once per bandwidth adjustment thereafter) is established in terms of the units of the raw measurements $m_n$ and $\xi_n$ to avoid unnecessary calculations. Similarly, the effective burst length $b_{ef}{}^n$ is also calculated only if the filtered $\hat{m}_n$ or $\hat{\xi}_n$ falls outside of the adaptation region. As will be discussed hereinafter, an adaptation region is established around a target red marking probability $\xi_T$ and a target mean bit rate $\hat{m}_T$ corresponding to the mean bit rate for the sampling interval j after which the previous update was implemented and which has been used by the network since that previous update.

As taught in the aforementioned patent application Ser. No. 942,873, the effective burst length can be calculated by substituting for the actual traffic stream an equivalent traffic stream having the same peak rate R, the same mean bit rate m, and the same mean burst length b, but where the substituted traffic stream conforms to a model having an on/off process where the on and off periods are independent (mutually and among themselves) and are exponentially distributed. This "exponential substitution" process is used to calculate an effective burst length for the actual traffic stream so that the actual traffic steam has the same packet loss probability $\epsilon$ if the substituted traffic stream were fed to the same transmission link. The packet loss probability $\epsilon$ for the substituted traffic, as taught in the afore-mentioned application, is given by $$\epsilon = \frac{R(c - m)\exp(-\eta/b_{ef})}{(R - m)c - m(R - c)\exp(-\eta/b_{ef})} \quad (1)$$

where $$\eta = \frac{X(c - m)R^2}{(R - m)(R - c)c} \quad (2)$$

where c is the speed of the transmission facility being used and X is the buffer size of the transmission facility. Solving equations (1) and (2) for effective burst length gives $$b_{ef} = \eta/\ln \frac{R(c - m) + \epsilon m(R - c)}{\epsilon c(R - m)} \quad (3)$$

In the adaptation system of FIG. 4, the transmission facility is the leaky bucket module 34 and hence the packet loss probability $\epsilon$ is the red marking probability $\xi_n$ and the buffer size X is the size of the green token pool $M_n$. That is, the effective burst length is given by $$b^n_{ef} = \eta_n/\ln \frac{R(\gamma^2 - \hat{m}_n) + \hat{\xi}_n \hat{m}_n (R - \gamma^n)}{\hat{\xi}_n \gamma^n (R - \hat{m}_n)} \quad (4)$$

where $$\eta_n = \frac{M_g{}^n(\gamma^n - \hat{m}_n)R^2}{(R - \hat{m}_n)(R - \gamma^n)\gamma^n} . \quad (5)$$

If the loss (red pack) probability falls outside of the desired range, it is $b_{ef}{}^n$, together with R and $\hat{m}_n$, which are passed to the connection agent 38 of FIG. 3 in order to attempt a bandwidth update for the connection. If the bandwidth update request is accepted, new leaky bucket parameters $\gamma^{n+1}$ and $M_g{}^{n+1}$ are computed based on the new traffic parameters R, $\hat{m}_n$ and $b_{ef}{}^n$. The calculation and use of these leaky bucket parameters is taught in detail in the aforementioned copending application Ser. No. 07/943,097.

The filters 45 and 47 report estimates of mean bit rate and red marking probabilities, respectively, every t second. The value of t is determined by how fast connection agent 32 can get replies to a request launched on the network since it is useless for filters 45 and 47 to supply new estimates which might require new connection requests faster than such requests can be processed. Thus the sampling rate t is dependent on the maximum round trip delay of the network 10 of FIG. 1 and thus dependent on the network implementation. Each of filters 45 and 47 maps the current raw measurement and all of the previous measurements into an estimate of the filtered value. Let $x_1, x_2, \ldots x_n$ be the raw measurements and $\hat{x}_1, \hat{x}_2, \ldots, \hat{x}_n$ be the estimates (where x is either rn or $\xi$). While the mapping of filters 45 and 46 can be any function, in the preferred embodiment of the present invention this mapping is exponential. That is, the nth estimate $\hat{x}_n$ is given by $$\hat{x}_n = \alpha \hat{x}_{n-1} + (1-\alpha) x_n. \tag{6}$$

where the filter parameter $\alpha$, lying between zero and one ($0 < \alpha < 1$), determines the relative reliability of the two terms in equation (6). The value of $\alpha$ is determined as follows, taking up the mean rate filter 45 of FIG. 4 first. Associated with the mean bit rate rn is a number $T_m$ which is the amount of time required to collect the smallest amount of information from which a "sufficiently accurate" estimate of rn can be made. Let $N_m$ be the number of raw measurements of m received by filter 45 in time $T_m$, i.e., $N_m$ is the smallest integer larger than $T_m/t$. $N_m$ then is the smallest number of raw measurements of m needed to determine a $\hat{m}_{N_m}$ which is statistically reliable. For this reason, when it is first initialized, filter 45 does not report any estimates to compare unit 42 until $N_m$ measurements have been received. $N_\xi$ and $T_\xi$ can be defined similarly to represent the minimum number and minimum collection period of raw measurements for statistically reliable red marking probabilities in filter 47. If all of the mean rate estimates are constant and equal to m, the $N_m$th estimate is given by $$\hat{m}_{N_m} = \hat{m}_0 + (1 - \alpha_m^{N_m})(m - \hat{m}_0). \tag{7}$$

If, for example, it is desired to keep $\hat{m}_{N_m}$ within 90% of m from the initial condition $\hat{m}_0$, then $\alpha_m$ satisfies $$1 - \alpha_m^{N_m} = 0.9 \tag{8}$$

and $$\alpha_m = 0.1^{1/nm}. \tag{9}$$

Using confidence interval analysis, the determination of the value of $T_m$ (and of $T_\xi$) proceeds in the following steps:
1. Identify independent (or almost independent) identically distributed (IIDs) "experiments" involved in measuring mean rate;
2. Determine the minimum number of experiments needed to achieve a desired confidence interval; and
3. Determine $T_m$ as the amount of time needed to collect the minimum number (from the previous step) of experiment results.

Assuming that the traffic can be modeled as an on/off process satisfying the independence and exponential distribution assumptions, then the on/off cycles are the IID experiments. Let $B_n$ and $I_n$ be the nth on and off times, respectively, and let the mean bit rate in the nth cycle of length $B_n + I_n$ be $Y_n = RB_n/(B_n+I_n)$. The means of the common exponential distributions of $B_n$ and $I_n$ are represented by $\mu_b^{-1}$ and $\mu_i^{-1}$, respectively, and the mean of the IID random sequence $\{Y_n, n=1, 2, \ldots\}$ is given by $$m_\gamma = \rho R \text{ where } \rho = \mu_i/(\mu_i + \mu_b) \tag{10a}$$

and its standard deviation is approximately given by $$\sigma_\gamma = \sqrt{2}\, \rho(1 - \rho)R. \tag{10b}$$

Let $M_m$ be the smallest sample size in the sequence $Y_n$ such that the sample mean m has a confidence interval $(m - z_m, m + z_m)$ and a confidence level $\theta_m$. The let $w_m$ be obtained from the normal distribution table to satisfy $$P\{-w_m \leq W \leq w_m\} = \theta_m, \tag{11}$$

where W is normally distributed with zero mean and unit variance. Then $M_m$ is given by $$M_m = \left(\frac{w_m \sigma_\gamma}{z_m}\right)^2. \tag{12}$$

The time interval $T_m$ required for obtaining the desired confidence level is then as the time required to obtain $M_m$ raw measurements. If $b_{ef}$ is the mean burst length, then one measurement takes, on the average, $b_{ef}/m$ seconds and $T_m$ is given by $$T_m = M_m \frac{b_{ef}}{m}. \tag{13}$$

For the red marking probability filter 47 of FIG. 4, it is assumed that every packet has the same probability of being marked red and that whether or not it is marked red is independent of all of the others. Although this is not strictly true, particularly when multiple packets arrive back-to-back during an on period, the results used herein are not very sensitive to the confidence level of the red marking probability $\xi$ estimates. Let $X_i$ be a random variable indicating whether the ith packet is marked red ($X_i = 1$) or green ($X_i = 0$). Then $$X_i = \begin{cases} 1 \text{ with probability } \xi \\ 0 \text{ with probability } (1 - \xi). \end{cases} \tag{14}$$

The standard deviation $\sigma_x$ of $X_i$ is $$\sigma_X = \sqrt{\xi - \xi^2}. \tag{15}$$

Using the same steps used to compute the mean bit rate measuring period $T_m$, the smallest number $M_\xi$ of X observations to achieve a confidence interval of $(\xi - z_\xi, \xi + z_\xi)$ and confidence level $\theta_\xi$ is given by $$M_\xi = \left(\frac{w_\xi \sigma_X}{z_\xi}\right)^2, \tag{16}$$

where $w_\xi$ is obtained similarly to $w_m$. The desired measuring period $T_\xi$ is then obtained as the time to observe the $M_\xi$ packets. If L is the mean packet length (in bits), a packet will arrive on the average every $L/m$ seconds and $T_\xi$ is given by $$T_\xi = M_\xi \frac{L}{m}. \tag{17}$$

The filters 45 and 47 of FIG. 4 thus utilize the measurement periods $T_m$ and $T_\xi$ defined in equations (13) and (17), respectively. Filtered values $\hat{m}_n$ and $\hat{\xi}_n$ of the mean bit rate and the red marking probability thus delivered to compare unit 42 once every $T_m$ and $T_\xi$ seconds, respectively. These filtered values form a set which can be compared in unit 42 to the acceptable sets of these values to determine whether or not adaptation is required, i.e., a new connection request is warranted. This comparison will be discussed in connection with the adaptation region disclosed graphically in FIG. 5.

Figure 5:
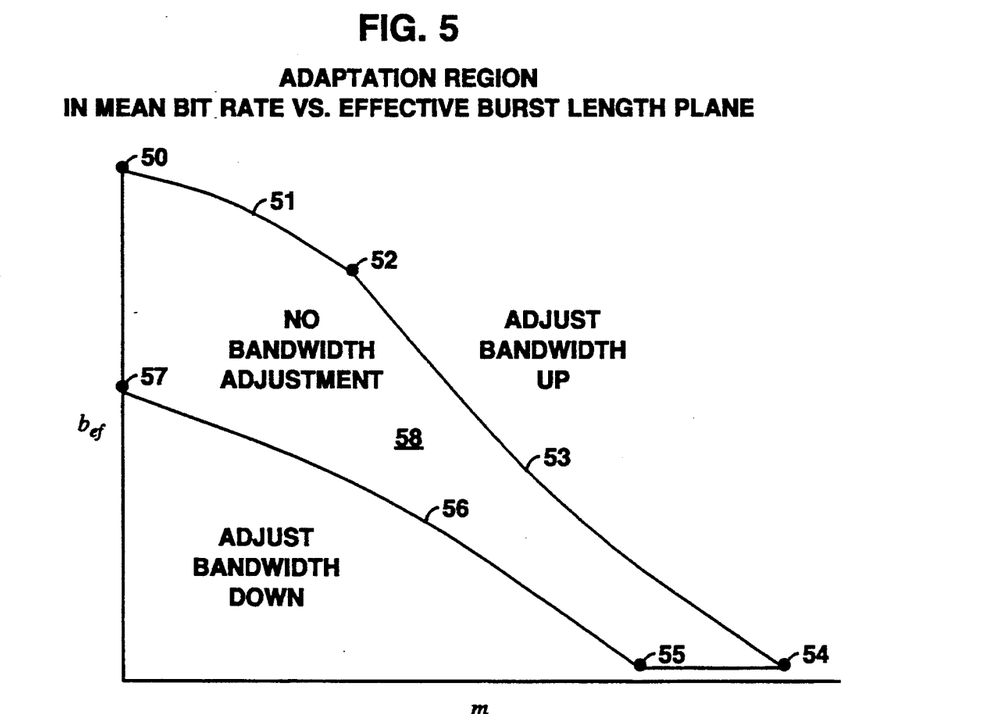
FIG. 5 shows a graphical representation, in the mean bit rate effective burst length plane, of the adaptation region outside of which new connection parameters are requested for an existing connection in accordance with the present invention.

Before proceeding to a discussion of FIG. 5, it should generally be noted that a new connection is requested when the mean bit rate or the burstiness of the input traffic renders the leaky bucket mechanism 34 incapable of insuring 1) the negotiated overall packet loss probability of that connection or 2) the packet loss probability of other connections sharing the same links. On the other hand, a new connection can also be requested when the mean bit rate or the burstiness of the input traffic falls sufficiently low that 3) the throughput of the network can be increased by reducing the bandwidth allocation for that connection, in the process also reducing the user cost based on allocated bandwidth. In accordance with the present invention, these three conditions are used to define the bounds of the adaptation region shown in FIG. 5, as will be shown below.

In FIG. 5 there is shown a graphical representation of the adaptation region in accordance with the present invention for adapting the bandwidth of a packet network connection in response to changes in the mean bit rate and/or the burstiness of the traffic input to the network. Curve 51, between points 50 and 52, represents the limit on the current connection's overall packet loss probability. For the sake of simplicity, if the overall packet loss probability $\epsilon_c$ of this connection stays within the negotiated order of magnitude, that is, if $\epsilon_c \in (0.5, 5.0) \times \epsilon_T$, then no adaptation adjustment is necessary. If $\epsilon_g$ and $\epsilon_r$ are the loss probabilities, respectively, for the green and the red packets in the network, it is assumed that the bandwidth allocation is done to equalize these two loss probabilities and that the buffer management satisfies the order relationship $$O(\epsilon_c) = \xi_T O(\epsilon_r) + (1 - \xi_T) O(\epsilon_g), \tag{18}$$

where $\xi_T$ is the red marking probability, i.e., $\xi_T = O(\epsilon_g)/O(\epsilon_r)$. When $\xi$ increases beyond $\xi_T$, the overall loss probability $\epsilon_c$ becomes unacceptable and the bandwidth must be adjusted upward. In FIG. 5, curve 51 is the collection of $(m, b_{ef})$ points that yield $\xi = k_1 \xi_T$ where $k_1$ is 5, the high order of magnitude limit on the target probability loss. That is, curve 51 is the collection of sets of values of $m$ and $b_{ef}$ which satisfy $$\frac{R(\gamma - m)\exp(-\eta/b_{ef})}{(R - m)\gamma - m(R - \gamma)\exp(-\eta/b_{ef})} = k_1 \xi_T, \tag{19}$$

where $$\eta = \frac{M_g(\gamma - m)R^2}{(R - m)(R - \gamma)\gamma}. \tag{20}$$

Curve 53 between points 52 and 54 of FIG. 5 represents the limit on the amount this connection is allowed to unfairly impact on other connections sharing the same transmission links. It is first noted that launching of excess traffic into the network is more likely to first affect the average delay seen by other connections before impacting the loss probability of these other connections, due mainly to the red discard thresholds imposed at the intermediate nodes. The buffer occupancy of the buffer in a link is a measure of this average connection delay when this connection source is input into the buffer with an effective transmission rate equal to the bandwidth reserved on that link for this connection. The presence of the leaky bucket is ignored since, if curve 51 is satisfied, then all of the traffic will enter the network without being shaped by the leaky bucket, as long as there is no limit on the amount of red traffic that can be sent into the network. The buffer content due to both the green and the red traffic must be considered since the traffic priority is on a first-come, first-served, basis and the impact of the red discard threshold on the average delay will be minimal since the red discard threshold is designed to control discard probabilities.

Curve 53 of FIG. 5 is determined in the following way. Let $\bar{v}$ be the average buffer content for the original source. When the average buffer occupancy increases to a multiple $k_2 \times \bar{v}(k_2 > 1)$, the traffic is deemed to be unacceptable to the network. The value of the coefficient $k_2$ depends on the bandwidth of the connection relative to the link's capacity, the larger this ratio, the smaller the value of $k_2$. Moreover, since a connection path generally consists of more than one link, the buffer capacity in some links may become unacceptable sooner than the others. The link in which the buffer occupancy first becomes unacceptable is that link in which the connection's reserve capacity contribution is the smallest. As discussed in the aforementioned copending application Ser. No. 943,097, the green token generation rate $\gamma_g$ of the leaky bucket is set equal to this minimum reserve capacity contribution. Therefore, curve 53 is formed by the collection of all $(m, b_{ef})$ points which satisfy the relationship (21)

$$\frac{m}{\gamma \delta} = k_2 \bar{v}, \tag{21}$$

where $$\delta = \frac{(\gamma - m)R^2}{(R - m)(R - \gamma)\gamma b_{ef}}. \tag{22}$$

Curve 56 between points 55 and 57 represents the lower limit on the adaptation region of FIG. 5 and is heavily dependent on the customer billing structure. For each connection, a different amount of bandwidth is reserved on each link along the path, depending on the initially assumed characteristics of the traffic. The amount charged to the customer is, in general, related to these amounts of reserved bandwidth. If it is assumed that the customer is billed by an amount proportional to the bandwidth $\gamma$, then curve 56 is the collection of all $(m, b_{ef})$ points that result in the $\gamma$ parameter being some fraction $k_3$ of the current value, where the fraction $k_3$ depends on the size of the connection and implementation constraints such as bandwidth update overhead. For lower bandwidth connections, $k_3$ can be smaller since update overhead is the same regardless of the bandwidth of the connection.

For simplicity, it is assumed the all of the buffer sizes are the same (X) and that the target loss probabilities for each link are the same ($\epsilon_r$). It is further assumed that the traffic characteristics are such that $\gamma$ is equal to the equivalent capacity of the connection. In this case, curve 56 of FIG. 5 is the collection of all (m, $b_{ef}$) points satisfying the relationship $$R \times \frac{y - X + \sqrt{(y - X)^2 + 4yXm/R}}{2y} = k_3\gamma, \quad (23)$$

where $\gamma$ is the current token generation rate and $$y = \frac{(R - m)}{R} b_{ef} \ln \frac{1}{\epsilon_T}. \quad (24)$$

In accordance with the illustrative embodiment of the present invention, the adaptation region 58 of FIG. 5 is bounded by equations (19)–(24) and represents a region within which adaptive adjustments in the connection bandwidth are not required. Above region 58, the bandwidth is adjusted upward while below region 58 the bandwidth is adjusted downward. The values of $k_1$, $k_2$, $k_3$ can be adjusted to reflect local requirements of the network 10 of FIG. 1. Generally, however, $k_1$ lies in a range between 2 and 10, $k_2$ lies in a range between 1.1 and infinity, and $k_3$ lies in a range between zero and 0.9. In one application, $k_1=5$, $k_2=2$ and $k_3=0.8$ performed well.

It will be noted that the comparisons necessary to determine violations of the adaptation requirements summarized in FIG. 5 require conversion of the red marking probability data into effective burst lengths to permit the comparison. Since this conversion is a complex floating point operation and is required every comparison period, considerable time would be lost in calculating effective burst lengths which would never be used (since this effective burst length is otherwise used only if a new connection is requested, i.e., the $\hat{m}_n$, $\hat{\xi}_n$ points fall outside of the region 58 of FIG. 5). In accordance with the present invention, the computation load on the bandwidth management subsystem of the present invention is significantly reduced by remapping the adaptation region 58 of FIG. 5 in terms of the actual measured quantities $\hat{m}_n$ and $\hat{\xi}_n$. This remapping is shown in FIG. 6.

Figure 6:
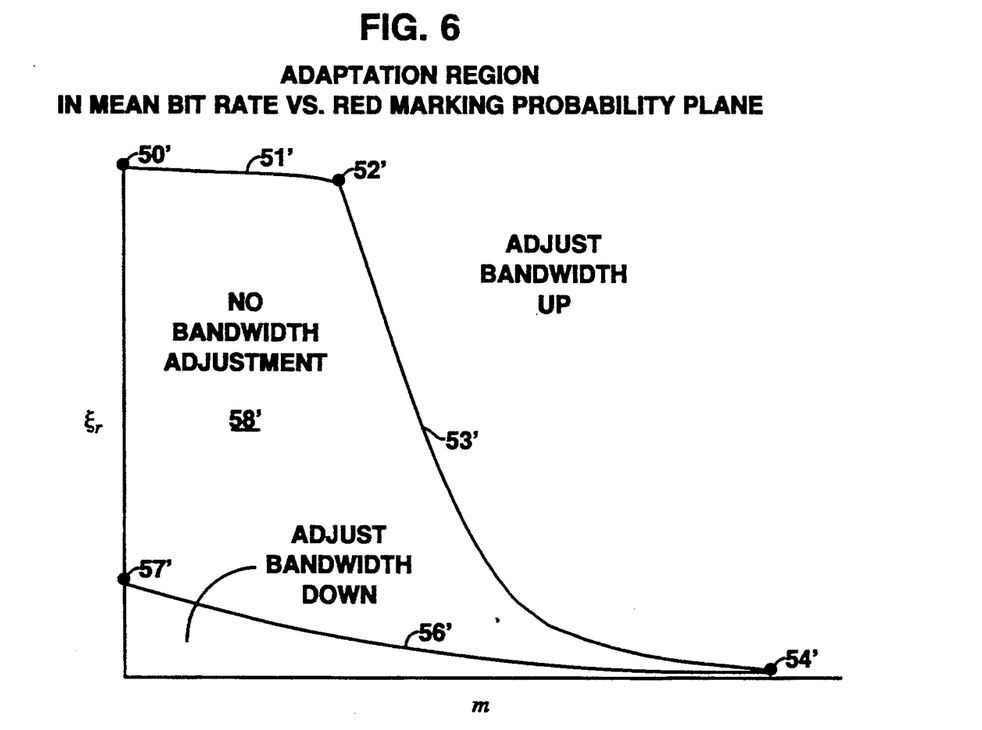
FIG. 6 shows the adaptation region of FIG. 5 replotted on the mean bit rate, red marking probability plane to reduce the computational requirement of determining operation outside of this adaptation region.

In FIG. 6 there is shown a graphical representation of the adaptation region of FIG. 5 mapped to the average bit rate (m) and red packet marking probability ($\xi$) plane. The same reference numerals used in FIG. 5, with an accent attached, are used in FIG. 6 to represent corresponding portions of the adaptation region. Thus adaptation region 58' of FIG. 6 is bounded by curves 51', 53' and 56', corresponding to equations (19), (21) and (23), respectively. Any point on the (m, $b_{ef}$) plane can be mapped into a point on the (m, $\xi$) plane, given the initial traffic characterizations R, m, $b_{ef}$, by using the relationship $$\xi = \frac{R(\gamma - m)\exp(-\eta/b_{ef})}{(R - m)\gamma - m(R - \gamma)\exp(1\eta/b_{ef})}, \quad (25)$$

where $\eta$ is defined in equation (20). Although this remapping also involves complex computations, it need be undertaken only once every bandwidth update rather than once every decision period (t). The set of points within region 58' can be denoted by $R(\hat{m}_j, \xi_T)$ where $\hat{m}_j$ is the m value used by the subsystem of FIG. 3 to set up the currently existing connection and $\xi T$ is the target red marking probability currently being enforced by the leaky bucket module 34.

Figure 7:
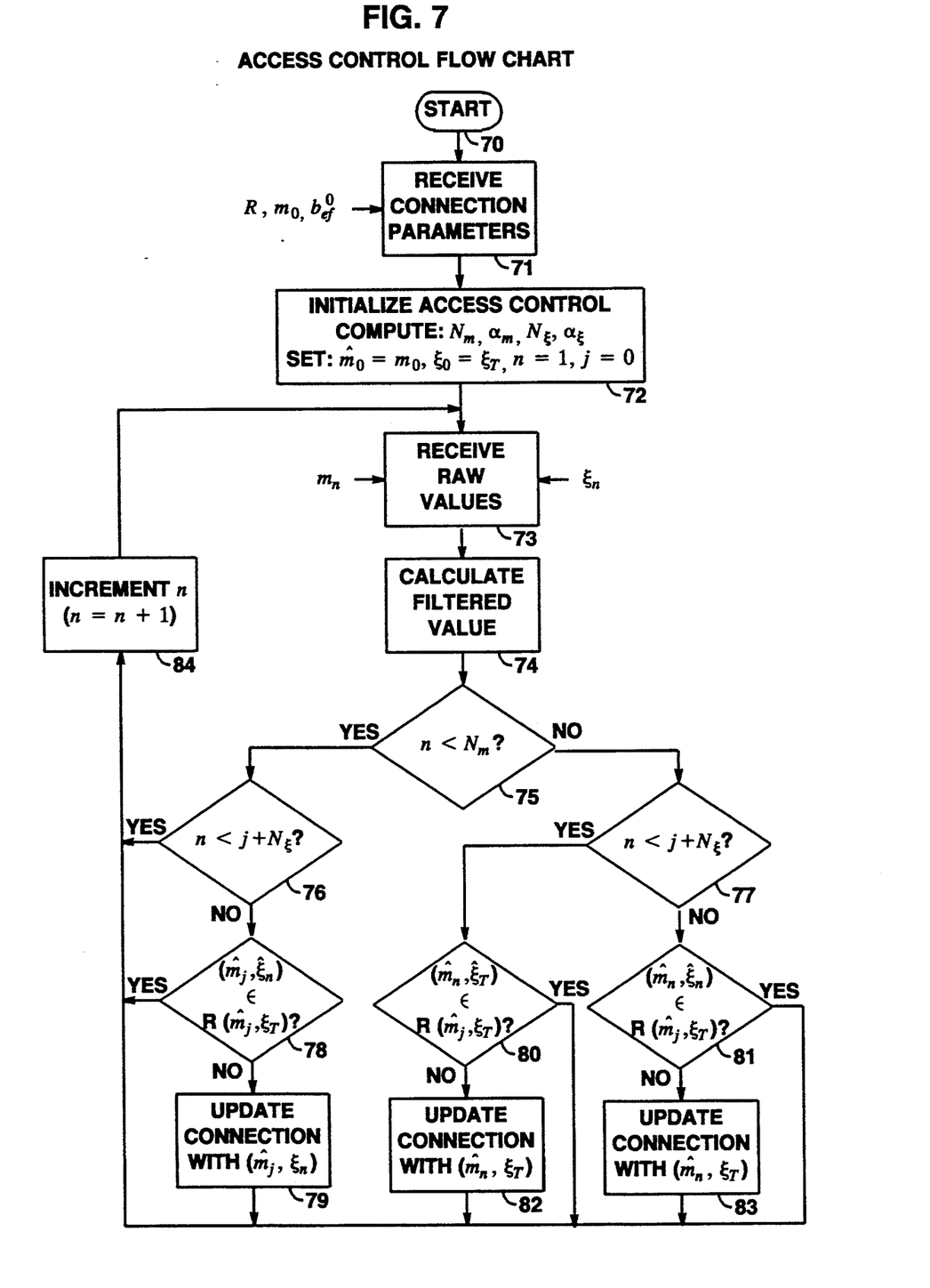
FIG. 7 shows a flow chart of the process for controlling the access to a packet communications network such as that shown in FIG. 1, using the adaptation region illustrated graphically in FIG. 6.

In FIG. 7 there is shown a flow chart of the operation of the estimation and adaptation module 33 of FIG. 3, shown in more detail in FIG. 4. The adaptation algorithm shown in FIG. 7 can be summarized as follows:

ACCESS CONTROL ALGORITHM

A. Initialization: Given the initial traffic parameters (R, $m_0$, $b_{ef}^0$):
  1. Compute $N_m$ and $\alpha_m$, using equations (9)–(13).
  2. Compute $N_\xi$ and $\alpha_\xi$, using equations (15)–(17).
  3. Compute the region $R(m_0, \xi_T)$ in the (m, $\xi$) plane.
  4. Set $\hat{m}_0 = m_0$, $\hat{\xi}_0 = \xi_T$, n=1 and j=0.

B. At the end of each measurement interval n, n=1, 2, ..., filter the measurements of m and $\xi$, using the exponential filter of equation (6).

C. Test for $(n < N_m)$, i.e. has a sufficient number of raw m measurements been received to calculate a sufficiently accurate $\hat{m}_n$?
  1. If yes, test for $(n < j + N_\xi)$, i.e., has a sufficient number of raw $\xi$ measurements been received since the last connection establishment to calculate a sufficiently accurate $\hat{\xi}_n$?
     a. If not, increment n=n+1 and return to step (B).
     b. If yes, test for $(\hat{m}_j, \hat{\xi}_n) \in R(\hat{m}_j, \hat{\xi}_T)$, i.e., is the current (m, $\xi$) set within region 58' of FIG. 6?
        If within region 58', increment n and return to step (B).
        If outside of region 58', skip to step (D), requesting a new connection, using the parameters $(\hat{m}_j, \hat{\xi}_n)$.
  2. If $(n \geq N_m)$, test for $(n < j + N_\xi)$, i.e., if a sufficient number of raw m measurements has been received, has a sufficient number of raw $\xi$ measurements been received since the last connection establishment?
     a. If not, increment n and return to step (B).
     b. If yes, test for $(\hat{m}_n, \hat{\xi}_n) \in R(\hat{m}_j, \hat{\xi}_T)$, i.e., is the current m, $\xi$ pair within region 58' of FIG. 6?
        If within region 58', increment n and return to step (B).
        If outside region 58', skip to step (D), requesting a new connection, using the parameters $(\hat{m}_n, \hat{\xi}_n)$.

D. Request connection agent 38 (FIG. 3) for a new connection, using the parameters received from one of the above steps.

E. Wait for new system parameters ($\gamma$, $M_g$, $N_m$, $N_\xi$, $\alpha_m$, $\alpha_\epsilon$) from connection agent 22. This wait is required only for bandwidth increases. Bandwidth decreases can always be accommodated within the originally reserved bandwidth.

F. Reset all system parameters to the new values.
  1. Set $\hat{\xi}_n = \xi_T$ and set j=n.
  2. Increment n=n+1.
  3. Return to step (2).

Referring to FIG. 7, starting at start box 70, box 71 is entered where the connection parameters from the initial connection request for a connection (R, $m_0$, and $b_{ef}^0$) are received (at the same time the initial connection request message is launched on the network by connection agent 32 (FIG. 3)). In box 72, all of the variable parameters of the estimation and adaptation module of FIG. 4 are computed. In particular, the minimum number $N_m$ of raw mean bit rate measurements, the mean bit rate filter 45 weighting factor $\alpha_m$, the minimum number $N_\xi$ of raw red token probability measurements, and the red token probability filter 47 weighting factor $\alpha_\xi$. In addition, the initial filtered value of $\hat{m}_0$ is set at the initial request value of $\hat{m}_0$, the initial filtered value $\hat{\xi}_0$ is set at the target red packet marking probability $\tilde{\pi}_T$ in box 72. Finally, in box 72, the measurement period index n is set to "1" and the connection request number j is set to "0". In box 73, the next raw measurements are received, a mean bit rate $m_n$ and a red token probability $\xi_n$. These raw values are used in box 74 to calculate the filtered values $\hat{m}_n$ and $\hat{\xi}_n$, using the exponential filter equation (6).

The output of box 74 is applied to decision box 75 to determine if a sufficient number of mean bit rate raw measurements have been received to guarantee a sufficiently accurate mean bit rate estimate. If not, decision box 76 is entered to determine if a sufficient number of red marking probability raw measurements have been received to guarantee a sufficiently accurate red token marking probability estimate since the last connection update. Note that the raw mean bit rate measurements need be monitored for a minimum number only once for a connection, while the red token marking probability measurements must be monitored for a minimum number after each connection update since the leaky bucket parameters are updated whenever a connection is updated. If neither sufficient mean bit rate measurements nor sufficient red token marking probability measurements have been received, as determined by decision boxes 75 and 76, box 84 is entered where the measurement index n is incremented by one. Box 73 is then re-entered to receive the next raw measurement values.

If a sufficient number n of raw red token marking probability measurements have been received (at least $j+N_\xi$), as determined by decision box 76, decision box 78 is entered to determine if the $(\hat{m}_j, \hat{\xi}_n)$ point in the $(m, \xi)$ plane is within the adaptation region 58' of FIG. 6. If so, no adaptation is required and box 84 is entered to increment n and re-enter box 73 to get the next raw measurement. If the point $(\hat{m}_j, \hat{\xi}_n)$ is outside of the adaptation region 58' of FIG. 6, as determined by decision box 78, box 79 is entered to request a connection with the new traffic characteristics $(m_j, \xi_n)$. That is, if sufficient $\xi$ samples have been received to accurately calculate $\hat{\xi}_n$, the red token probability estimate, but insufficient samples have been collected to accurately estimate the mean bit rate, nevertheless, the new $\xi_n$ estimate is combined with the mean bit rate in force from the last connection update and compared to the adaptation region 58' of FIG. 6. If these values fall outside of the adaptation region 58', then a new connection is requested in box 79. If a new connection is negotiated, a new adaptation region is calculated, new leaky bucket parameters are calculated, and new filter values are calculated. The details of this process in boxes 79, 82 and 83 will be discussed in connection with FIG. 8. After the connection is updated, box 84 is entered to increment n and box 73 re-entered to await the next measurement sample.

If it is determined in decision box 75 that a sufficient number of raw $mt_n$ samples have been received to provide a sufficiently accurate estimate of the mean bit rate, decision box 77 is entered where it is again tested as to whether a sufficient number of raw $\xi_n$ red marking probability samples have been received since the last leaky bucket update to estimate the red marking probability. Even if insufficient $\xi_n$ samples have been received, decision box 81 is entered to determine if the $(\hat{m}_n, \hat{\xi}_n)$ point falls within or outside of the adaptation region 58'. If the $(\hat{m}_n, \hat{\xi}_n)$ point does fall outside of the adaptation region 58', as determined by decision box 81, box 83 is entered to update the connection, using the new mean bit rate $\hat{m}_n$ but the target red marking probability $\xi_T$ as the update parameters. That is, even when sufficient raw $\xi_n$ samples have not been received, nevertheless the connection is updated if the mean bit rate has changed so much that the $(\hat{m}_n, \hat{\xi}_n)$ is no longer in the adaptation region 58'. After the connection is updated in box 83, box 84 is entered to increment n and box 73 re-entered to await the next measurement value. If the test point $(\hat{m}_n, \hat{\xi}_n)$ is within the adaptation region 58', as determined by decision box 81, box 84 is entered to increment n and box 73 reentered to await the next measurement value.

If it is determined in decision box 77 that sufficient $\xi_n$ values have been received to estimate the red marking probability, decision box 80 is entered to test if the $(\hat{m}_n, \hat{\xi}_T)$ point is within the adaptation region 58'. If so, box 84 is entered to increment n and re-enter box 73. If the $(\hat{m}_n, \hat{\xi}_T)$ point is outside of adaptation region 58', box 82 is entered to update the connection with the parameters $(\hat{m}_j, \xi_n)$. Box 84 is then entered to increment n and return to box 73.

The procedure shown in FIG. 7 is, in the preferred embodiment, implemented by programming a general purpose computer. If some of the highly iterative portions of the algorithm of FIG. 7 which are required on a per connection basis are implemented with high-speed special purpose circuitry, it is important that the interface between the high-speed circuitry and the computer be designed to minimize computer interrupts. It should also be noted that the adaptation region 58' of FIG. 6 can be implemented by sampling the value of $\xi$'s at a number of m's covering a range of m values to create a two dimensional array $\{\xi^L(m_i), \xi^H(m_i), 1=1,2,\ldots, K\}$ of regular rn values and the corresponding $\xi$ values for each of curves 51', 53', and 56'. The m values need be sampled only in the range between zero and the currently used green token source rate $\gamma$ since $(\hat{m}_n > \gamma)$ always implies the need for an upward bandwidth adjustment ($\gamma$ is the maximum rate at which data can flow through the leaky bucket). The values of other $\xi$'s can be interpolated between the stored values. Given the resulting $\hat{m}_n$ and $\hat{\xi}_n$ values, the relative position of $\hat{\xi}_n$ with respect to $\xi^H(\hat{m}_n)$ and $\xi^L(\hat{m}_n)$ can be determined. If the new $\hat{\xi}_n$ estimate lies between these two values, the new measurement values are within region 58'; otherwise the values are outside of the adaptation region 58'.

One modification of the algorithm of FIG. 7 is to decrease the bandwidth more gradually than the bandwidth is increased. This can be accomplished by introducing an hysteresis parameter h ($0 < h < 1$) into the computations for $m_n$ and $b_{ef}$ for estimates below the lower boundary curve 56' of adaptation region 58'. That is, if the estimates $(\hat{m}_n, \hat{\xi}_n)$ are below curve 56', then $$m_n \leftarrow h m_j + (1-h)\hat{m}_n \qquad (26)$$

and $$b_{ef}^n \leftarrow h b_{ef}^j + (1-h) b_{ef}^n \qquad (27)$$

are used in computing the request vector and the new leaky bucket parameters. The value of h can be set at or near 0.5. Another variation of the algorithm of FIG. 7 is to delay requests for updates for a larger number of raw measurement samples, providing a more conservative adaptation strategy.

Figure 8:
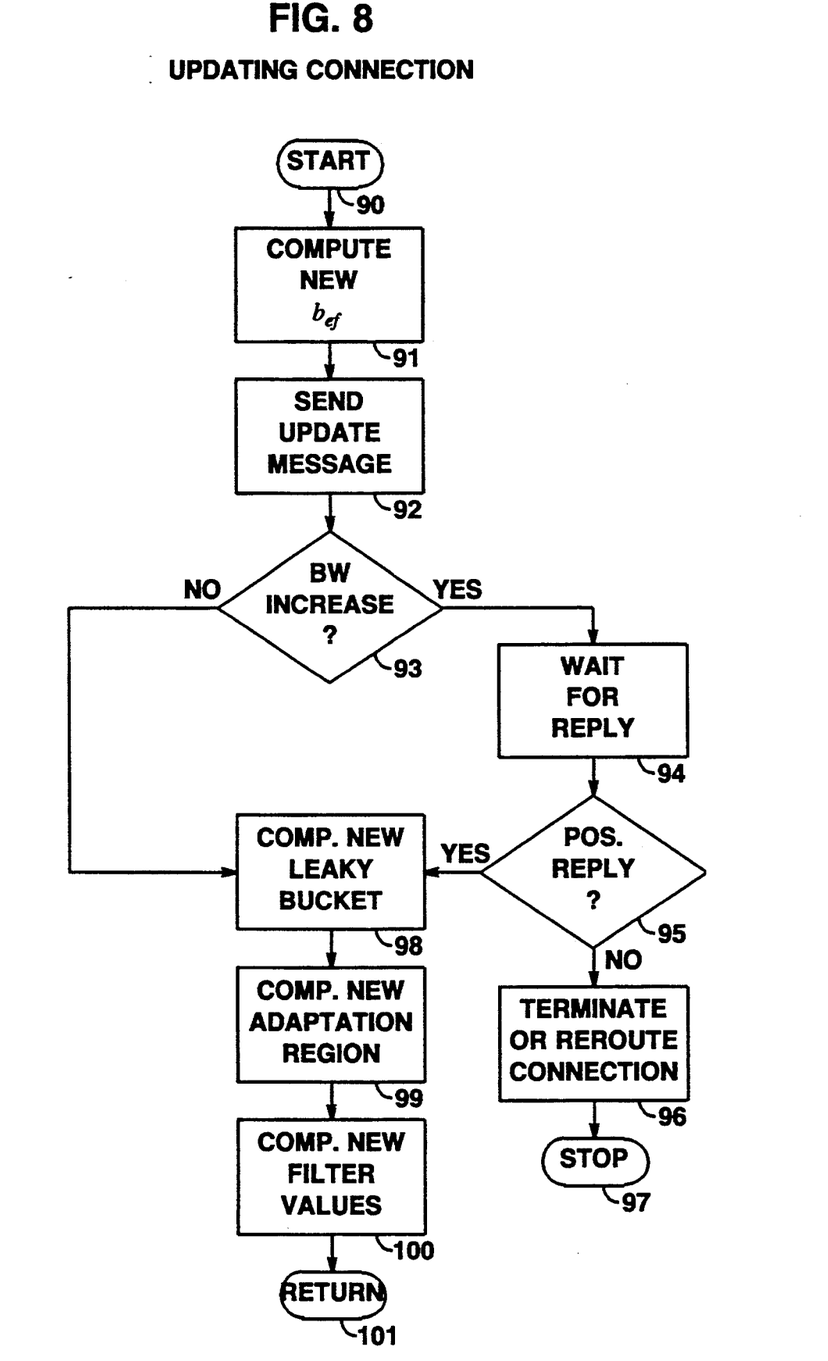
FIG. 8 shows a flow chart of the process for updating a connection when required by the procedure of the flow chart of FIG. 7.

In FIG. 8 there is shown a flow chart of the process for updating a connection, shown generally in boxes 79, 82, and 83 of FIG. 7 and in step (D) of the access control algorithm outlined above. The update connection algorithm of boxes 79, 82 and 83 of FIG. 7 can be summarized in the following substeps, utilizing the values of m and $\xi$ received from the flow chart of FIG. 7.

Connection Update Algorithm

A. Compute $b_{ef}$ from equation (3) and send a bandwidth update request message (FIG. 2) including the new $b_{ef}$, m and R.

B. Wait for a reply from the remote connection agent. If this is a bandwidth reduction request, no waiting is required; proceed directly to step (C).
  1. If the reply is negative, terminate or reroute the connection.
  2. If the reply is positive, proceed to step (C).

C. Compute the following quantities for the new connection:
  1. Compute the leaky bucket parameters $\gamma$ (the green token source rate) and $M_g$ (the green token pool size).
  2. Compute the new adaptation region $R$ (m,$\xi_T$) (FIG. 6).
  3. Compute new values for $N_m$, $\alpha_m$, $N_\xi$, and $\alpha_\xi$.

Referring more particularly to FIG. 8, starting at start box 90, box 91 is entered where the value of the new effective burst length $b_{ef}$ is calculated, using equation (3). Box 92 is then entered to launch a request from connection agent 32 (FIG. 3), using the connection characterization values specified in box 79, 82 or 83 of FIG. 7. Decision box 93 is then entered to determine if the request is for a bandwidth increase or a bandwidth decrease. If a bandwidth increase is requested, box 94 is entered where the system waits until the connection request propagates along the connection path to the remote receiving agent and a confirmation of the connection is returned to connection agent 32. Decision box 95 is then entered to determine if the reply is positive (update granted) or negative (update denied). If the update is denied, box 96 is entered to terminate the connection or to invoke other facilities, not herein disclosed, to reroute the connection. The procedure terminates in box 97.

If the connection request reply is positive, as determined by decision box 95, box 98 is entered where new leaky bucket parameters $\gamma$ (green token source rate) and $M_g$ (green token buffer size), as taught in the copending application Ser. No. 943,097, identified above. If a bandwidth decrease is requested, as determined by decision box 93, box 98 is entered directly since no wait for a response to the connection request message is required; the bandwidth will always be available from the wider bandwidth connection being replaced. After calculating the new leaky bucket parameters in box 98, box 99 is entered to compute the new adaptation region 58', using equations (19), (21) and (23), and, using equation (25) translated to the m,$\xi$ plane. In box 100, new filter values $N_m$, $\alpha_m$, $\alpha_\xi$ are computed which control filters 45 and 47 during the upcoming connection update.

It can be seen that the access control mechanism of the present invention insures that adequate bandwidth will be provided for each connection even when the characteristics of the signal source associated with that connection change significantly. This "dynamic adaptation" to the characteristics of the signal source, however, is controlled to prevent overly rapid updates to the connection parameters and the network overhead associated therewith. The bandwidth, measurement filters and leaky bucket access mechanism are all changed together to insure compatible treatment of the input traffic stream.

One obvious modification of the present invention is to replace the red marking probability $\xi$ of the leaky bucket mechanism with the probability that the token level at the leaky bucket mechanism is less than some predetermined threshold level. This latter metric is useful when a very small red marking probability is desired, for example if the red loss probability in the network were very high.

It should also be clear to those skilled in the art that further embodiments of the present invention may be made by those skilled in the art without departing from the teachings of the present invention.

What is claimed is:

1. A packet communications network comprising
   a plurality of nodes,
   means for interconnecting source nodes and destination nodes of establishing a connection for the transmission of digital packets of information from a source node to a destination node in said network, and
   a dynamic access control mechanism,
   said dynamic access control mechanism comprising
   means for measuring the mean bit rate of signals from said source,
   a leaky bucket control circuit for controlling the flow of said signals from said source into said network,
   means for measuring the loss probability of packets introduced by said leaky bucket control circuit,
   means for establishing limits on the values of simultaneous pairs of measurements from said means for measuring the mean bit rate and said means for measuring the loss probability, and
   means responsive to a pair of said mean bit rate and loss probability measurements falling outside of said limits for modifying the bandwidth allocated to said connection.

2. The packet communications network according to claim 1 wherein said means for establishing limits comprises
   means for determining limits of an order of magnitude range of values around said mean bit rate and said loss probability measurements.

3. The packet communications network according to claim 1 wherein said means for measuring said mean bit rate comprises
   filtering means for filtering a plurality of said mean bit rate measurements.

4. The packet communications network according to claim 1 wherein said means for measuring said loss probability comprises
   filtering means for filtering a plurality of said loss probability measurements.

5. The packet communications network according to claim 2 wherein said limits represent values of the mean bit rate m and the packet loss probability $\xi$ satisfying the relationships $$\frac{R(\gamma - m)\exp(-\eta/b_{ef})}{(R - m)\gamma - m(R - \gamma)\exp(-\eta/b_{ef})} = k_1 \xi_T,$$

where

-continued $$\eta = \frac{M_g(\gamma - m)R^2}{(R - m)(R - \gamma)\gamma},$$

and $$\frac{m}{\gamma\delta} = k_2\bar{v},$$

where $$\delta = \frac{(\gamma - m)R^2}{(R - m)(R - \gamma)\gamma b_{ef}}.$$

and $$R \times \frac{y - X + \sqrt{(y - X)^2 + 4yXm/R}}{2y} = k_3\gamma,$$

where $$y = \frac{(R - m)}{R} b_{ef} \ln \frac{1}{\epsilon_T},$$

R is the maximum bit rate of signals from said source node,
$\gamma$ is the green token source rate of said leaky bucket control circuit,
$b_{ef}$ is the effective burst length of signals from said source node,
$k_1$ is a constant between two and ten,
$\xi_T$ is a desired red token loss probability of said leaky bucket control circuit,
$M_g$ is the size of the green token buffer in said leaky bucket control circuit,
$k_2$ is a constant between 1.1 and infinity,
$\bar{v}$ is the average buffer content of signals at said source node,
$\epsilon_T$ is a desired loss probability,
$k_3$ is a constant between zero and 0.9.

6. A method of dynamically adapting access to a packet communications network for interconnecting source nodes and destination nodes for the transmission of digital packets of information from said source nodes to said destination nodes, said method including the steps of
measuring the mean bit rate of signals from said source node,
utilizing a leaky bucket control circuit to control the flow of said signals from said source node into said network,
measuring the loss probability of packets introduced into said network by said leaky bucket control circuit,
establishing limits on the values of simultaneous pairs of measurements from said mean bit rate measuring step and said loss probability measuring step, and
in response to a pair of said mean bit rate and loss probability measurements falling outside of said limits, modifying the bandwidth allocated to a connection between said source node and said destination node.

7. The method according to claim 6 wherein said step of establishing limits comprises the step of
determining limits having an order of magnitude range of values around said mean bit rate and said loss probability measurements.

8. The method according to claim 6 wherein said step of measuring said mean bit rate comprises comprises the step of
filtering a plurality of said mean bit rate measurements.

9. The method according to claim 6 wherein said step of measuring said loss probability comprises comprises the step of
filtering a plurality of said loss probability measurements.

10. The method according to claim 7 wherein said step of establishing boundaries further includes the step of
determining values of said mean bit rate m and said packet loss probability $\xi$ satisfying the relationships $$\frac{R(\gamma - m)\exp(-\eta/b_{ef})}{(R - m)\gamma - m(R - \gamma)\exp(-\eta/b_{ef})} = k_1\xi_T,$$

where $$\eta = \frac{M_g(\gamma - m)R^2}{(R - m)(R - \gamma)\gamma},$$

and $$\frac{m}{\gamma\delta} = k_2\bar{v},$$

where $$\delta = \frac{(\gamma - m)R^2}{(R - m)(R - \gamma)\gamma b_{ef}}. \quad (22)$$

and $$R \times \frac{y - X + \sqrt{(y - X)^2 + 4yXm/R}}{2y} = k_3\gamma, \quad (23)$$

where
$k_1$ is a constant between two and ten,
$\xi_T$ is a desired red token loss probability of said leaky bucket control circuit,
$M_g$ is the size of the green token buffer in said leaky bucket control circuit,
$k_2$ is a constant between 1.1 and infinity,
$\bar{v}$ is the average buffer content of signals at said source node,
$\epsilon_T$ is a desired loss probability,
$k_3$ is a constant between zero and 0.9.

* * * * *